(12) United States Patent
Srinivasan et al.

(10) Patent No.: US 11,334,590 B2
(45) Date of Patent: May 17, 2022

(54) CLOUD-BASED DATABASE-LESS SERVERLESS FRAMEWORK USING DATA FOUNDATION

(71) Applicant: Accenture Global Solutions Limited, Dublin (IE)

(72) Inventors: Madhan Kumar Srinivasan, Bangalore (IN); Arun Purushothaman, Chennai (IN); Vijaya Tapaswi Achanta, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 700 days.

(21) Appl. No.: 16/235,815

(22) Filed: Dec. 28, 2018

(65) Prior Publication Data

US 2020/0210443 A1 Jul. 2, 2020

(51) Int. Cl.
| | |
|---|---|
| *G06F 16/25* | (2019.01) |
| *G06F 16/28* | (2019.01) |
| *G06F 16/14* | (2019.01) |
| *G06F 16/13* | (2019.01) |

(52) U.S. Cl.
CPC .......... *G06F 16/254* (2019.01); *G06F 16/13* (2019.01); *G06F 16/148* (2019.01); *G06F 16/285* (2019.01)

(58) Field of Classification Search
CPC .... G06F 16/254; G06F 16/285; G06F 16/148; G06F 16/13
See application file for complete search history.

(56) References Cited

U.S. PATENT DOCUMENTS

| | | | |
|---|---|---|---|
| 9,594,823 B2 | 3/2017 | Chaney et al. | |
| 10,855,754 B1* | 12/2020 | Mercier | H04L 67/1029 |
| 2003/0023439 A1* | 1/2003 | Ciurpita | G10L 15/22 |
| | | | 704/246 |
| 2013/0132967 A1 | 5/2013 | Soundararajan et al. | |
| 2013/0339972 A1* | 12/2013 | Zhang | G06F 11/3447 |
| | | | 718/104 |
| 2017/0357703 A1 | 12/2017 | Theimer et al. | |

(Continued)

OTHER PUBLICATIONS

Extended European Search Report in Europe Application No. 19198437.6, dated May 19, 2020, 8 pages.

(Continued)

*Primary Examiner* — Vaishali Shah
(74) *Attorney, Agent, or Firm* — Crowell & Moring LLP

(57) ABSTRACT

A system may support multiple tier serverless data foundation creation to support large data set processing. At a data ingestion tier, data ingestion serverless tasks may receive source data for processing. The data integration serverless tasks may filter and group the source data into file-object stored items. Further, data integration serverless tasks may capture metadata that, when paired with the file-object stored items, establishes the data foundation. The data foundation facilitates database-like performance in data operations in a database-less system. At the processing tier, the processing serverless tasks access the data foundation by iterating across the file-object stored items to generate output-object stored items. At the directed storage tier, directed storage serverless tasks capture metadata for the output-object stored items to establish an output data foundation or prepare the output data for storage in a data warehouse.

20 Claims, 5 Drawing Sheets

(56) References Cited

U.S. PATENT DOCUMENTS

| | | |
|---|---|---|
| 2018/0196867 A1 | 7/2018 | Wiesmaier et al. |
| 2018/0203744 A1 | 7/2018 | Wiesmaier et al. |
| 2019/0026150 A1* | 1/2019 | Shimamura ........... G06F 9/5038 |
| 2020/0167360 A1* | 5/2020 | Rath ..................... G06F 3/0644 |

OTHER PUBLICATIONS

Examination Report No. 1 in Australia Application No. 2019222934, dated Apr. 24, 2020, 7 pages.
Amazon, "Data Lake Foundation on Aws", <URL: https://web.archive.org/web/20181122214031/https://aws.amazon.com/solutionspace/data-lake-foundation-with-aws-services/> published on Nov. 22, 2018 as per Wayback Machine, obtained from the Internet on May 28, 2020, 6 pages.
Amazon, "Amazon SNS features", <URL: https://web.archive.org/web/20181227214136/https://aws.amazon.com/sns/features/> published on Dec. 27, 2018 as per Wayback Machine, obtained from the Internet on May 28, 2020, 6 pages.
Examination Report No. 2 for Australian application 2019222934 dated Sep. 29, 2020, 5 pages.
Santucci, D. "Building a serverless architecture for data collection with AWS Lambda". https://web.archvie.org/web/20170401185243/https://cloudacademy.com/blog/build-a-serverless-data-pipeline-with-aws-lambda published Apr. 1, 2017.

* cited by examiner

CLOUD-BASED DATABASE-LESS SERVERLESS FRAMEWORK USING DATA FOUNDATION

TECHNICAL FIELD

This disclosure relates to a cloud-based database-less serverless framework.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for execution of analytics systems will further enhance the capabilities of cloud computing systems.

BRIEF DESCRIPTION OF THE DRAWINGS

FIG. 1 shows an example multiple tier serverless system.

DETAILED DESCRIPTION

Figure 1:
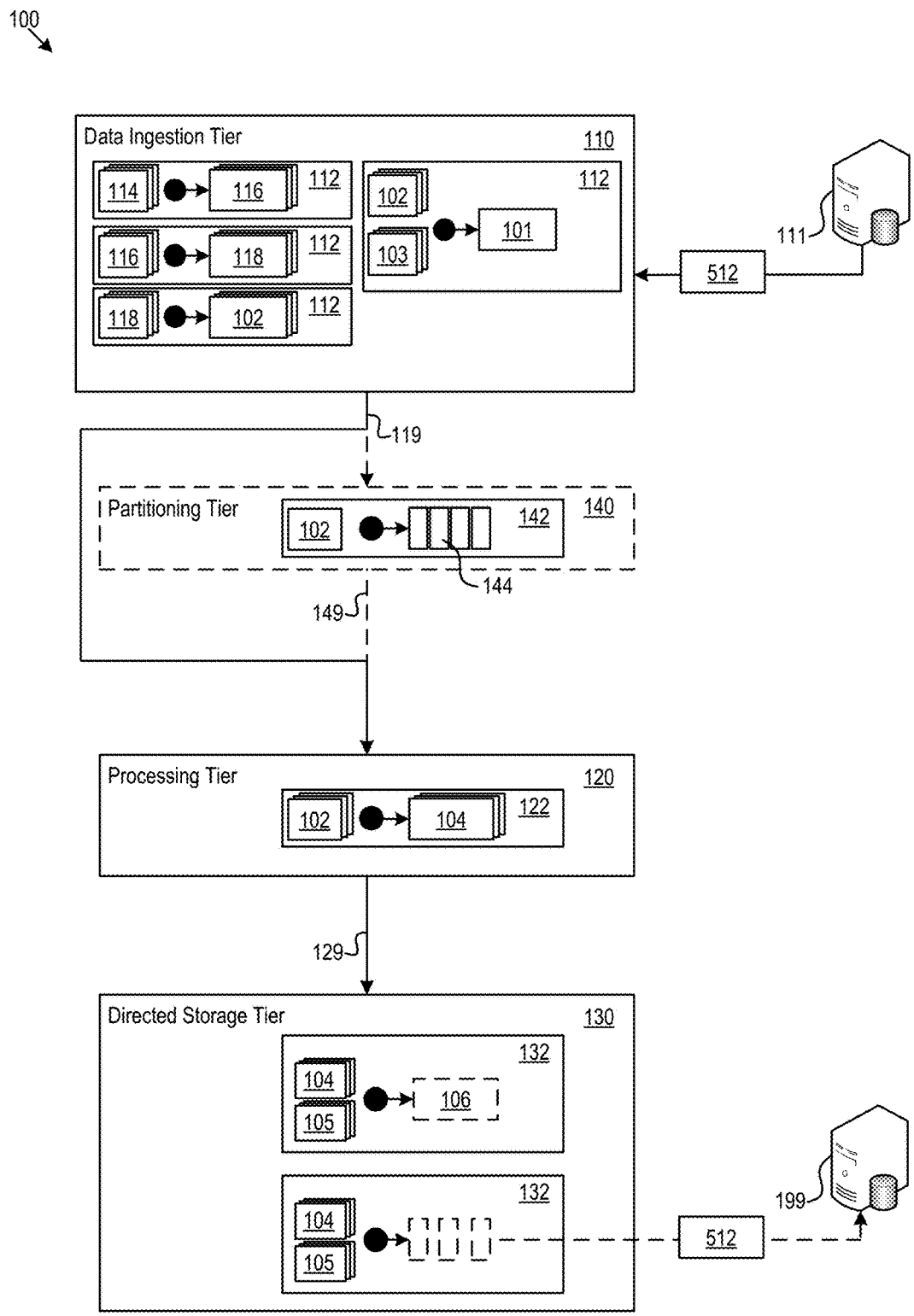
FIG. 1 show an example multiple tier serverless system.

Serverless cloud-based systems may allow operators to run a routine, execute an application, or perform other types of computational tasks (e.g., serverless tasks) without necessarily requiring the operator to first define a virtual system or requisition specific hardware on which to perform the computational task. Accordingly, an operator may request the performance of a serverless task without designating any particular hardware or virtualized hardware on which the serverless task should run.

Similarly, stored items, such as those stored in an object storage environment or other stored items, may not necessarily be attached to particular storage hardware. For example, a stored item may be associated with storage identifier and retrieved through provision of that identifier to a host interface. The disassociation of the stored item with particular storage hardware and/or reserved virtualized storage hardware allows flexibility in selection of platforms for storage and retrieval from storage.

Database systems use a combination of storage and processing to provide indexed retrieval of stored data. In some cases, the data stored may be indexed using numerous processor cycles. The indexing allows for accurate retrieval of the data under differing search terms, queries, specific retrieval requests or other storage access operations. Accordingly, overall performance in database systems may be dependent on both processing and storage performance within the database system.

In some cases, using the techniques and architectures disclosed herein, storage and processing may be provided via stored items that are disassociated with reserved storage volumes and serverless tasks to create database-like performance in a cloud-based database-less system. A data foundation may refer to a computational processing data storage platform using a system of file-objects, as discussed in detail below. A data foundation may be created using tiered processing circuitry, which may operate in the context of a cloud-based database-less serverless framework. The data foundation may be created via filtering and association processing performed by serverless tasks and then stored (under the direction of the serverless tasks) as stored items, for example in an object storage paradigm. The stored items may include file-object stored items associated (e.g., through processing via the serverless tasks) with metadata defining topic associations within the file-object stored items. In some implementations, metadata may be associated with the file-object stored item by storing the metadata within the associated file-object stored item or by storing the metadata in another file-object stored item and including a reference to the associated file-object stored item.

In various implementations, file-object stored items may be created by filtering input data according to topics to generate topic-associated data. The topic-associated data may then be grouped into a stored item to generate a file-object stored item. A corpus of one or more file-object stored items along with associated metadata that captures to the topic relationships in in the file-object stored items makeup a data a data foundation.

In some cases, use of a data foundation and/or the file-object stored items and metadata which make up the data foundation in accord with the techniques and architectures described herein may improve the operation of the underlying hardware on which the data foundation is implemented. The data foundation may allow database-less hardware to perform like (and in some cases outperform) data-based hardware in database-like operations, such as batch data processing, analytics processing, or other big-data computing tasks. Further, the data foundation provide increased flexibility relative to database system through operation in serverless computing environment paired with hardware disassociated storage environments. Thus, the data foundation executed in accord with the techniques and architectures described herein provides a technical solution to a technical problem by providing a flexible hardware architectural replacement to database systems. Further, the serverless tasks creating and accessing the data foundation may be parallelized or serialized to increase performance or increase resource consumption efficiency without necessarily reconfiguring designated hardware on which the data foundation is implemented. Conversely, to alter the performance/efficiency of a database system, reconfiguration may be compulsory. Hence, the use of a data foundation and/or the file-object stored items and metadata which make up the data foundation in accord with the techniques and architectures described herein provides an improvement (that is both technical and market driven) over existing market solutions.

In serverless cloud computing environments, computing providers may enforce execution limits, such as task timeouts, maximum processing loads, processor cycles, or other limits on compute resource consumption. In some cases, the execution limits may be enforced per serverless task. Accordingly, the provider may force a serverless task to terminate within the execution limit. In an illustrative example, an example provider may enforce a five-minute task timeout for serverless tasks implemented using the provider's cloud platforms. Accordingly, tasks may not necessarily execute for longer than five minutes from start to termination.

In some cases, creation of a data foundation and execution of a processing application on that data foundation in a serverless cloud system may call for computing resources in excess of a defined execution limit. Implementation of the data foundation may be automatically and dynamically divided or partitioned prior to commencement by a multiple tier serverless execution structure (MTSES) system, such as that described in U.S. patent application Ser. No. 16/159, 399, filed 12 Oct. 2018, and entitled Distributed Multiple Tier Multi-Node Serverless Framework for Complex Analytics Task Execution, which is incorporated by reference herein in its entirety. Therein, the tasks within a computing project being performed with the application may be completed after the system dynamically and automatically divides or parses the received single computing project across multiple serverless tasks. In some cases, the system may dynamically form, generate and/or allocate the serverless task to be partially or fully concurrent such that data may be passed between the serverless tasks to achieve computational continuity that persists beyond the executions limits, to achieve coordinated parallel computing among the tasks, or achieve some combination thereof. To divide the computing project, the MTSES system may dynamically determine one or more partitioning criteria to guide division of the computing project. For example, the partitioning criteria may be used to partition a dataset with detail data (or pre-processed data) such that multiple serverless tasks each perform an analytic analysis on a portion of the dataset. Accordingly, the computing project as a whole may be performed by the system dynamically developing and coordinating multiple serverless task each acting on a portion of the input data to the system.

Referring now to FIG. 1, an example multiple tier serverless system (MTSS) 100 is shown. The multiple tiers of the MTSS 100 may execute on processing circuitry making up the hardware underpinning of the MTSS 100. In this example, the MTSS 100 includes a data ingestion tier 110, a processing tier 120, and a directed storage tier 130. In some implementations, the MTSS may further include a partitioning tier 140 between the data ingestion tier and the processing tier 120.

In various illustrative scenarios, the MTSS 100 may be used as a platform for computing analytics, batch processing, data set processing, or other data processing tasks. Accordingly, the MTSS 100, using serverless processes executing at the data ingestion tier, may obtain input data from various sources.

Figure 2:
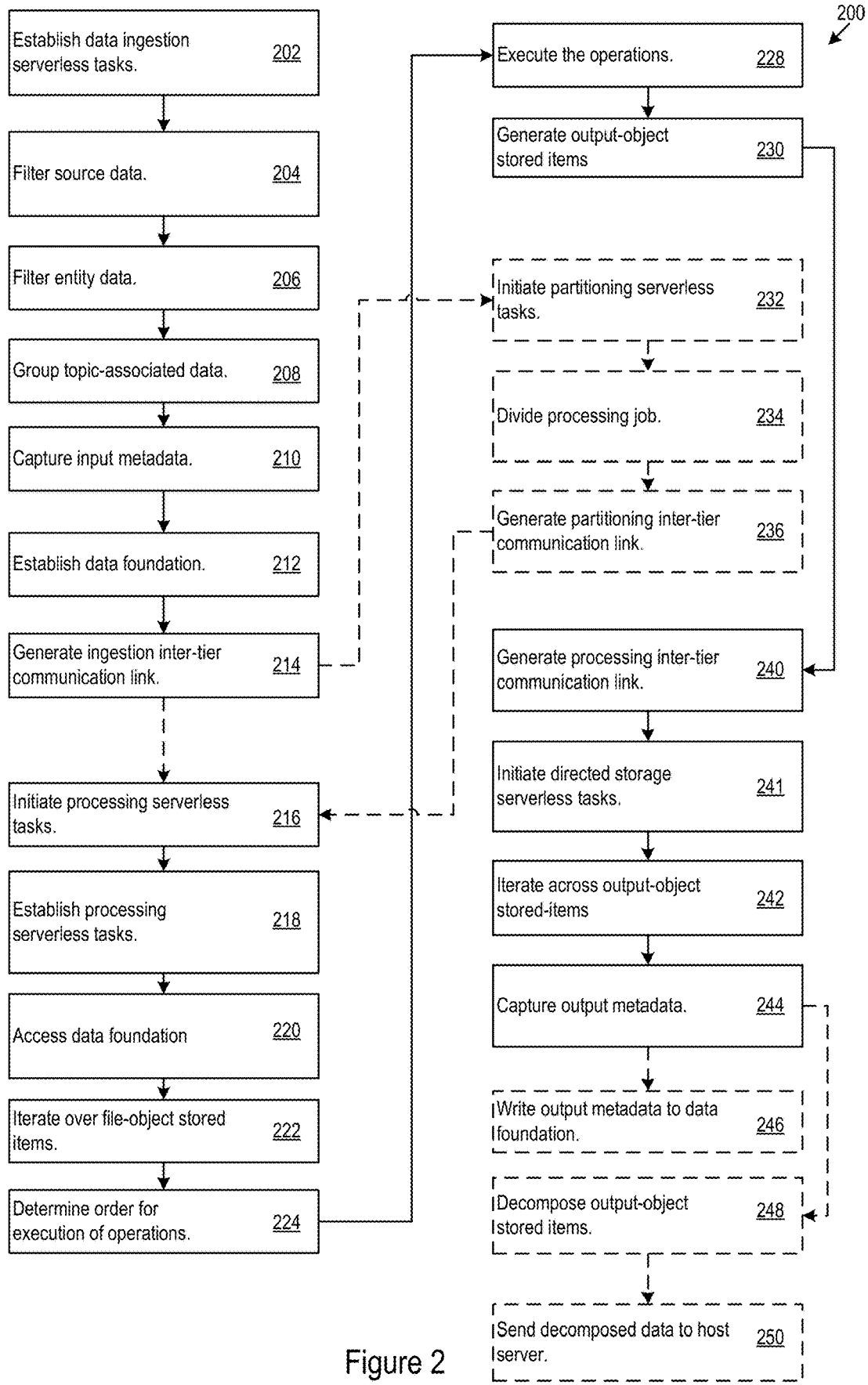
FIG. 2 shows example multiple tier data foundation logic.

In the following, reference is made to the MTSS 100 of FIG. 1 and the corresponding example multiple-tier data foundation logic (MTDFL) 200 in FIG. 2 in the context of the MTSS 100 system. The logical features of the MTDFL 200 may be implemented in various orders and combinations. For example, in a first implementation, one or more features may be omitted or reordered with respect to a second implementation.

At the data ingestion tier 110, the MTDFL 200 may establish one or more data ingestion serverless tasks 112 (202). In various implementations, via the data ingestion serverless tasks, the MTSS 100 may access one or more sets (e.g., sets 1, 2, . . . , n) of source data 114 (e.g., historical utilization data, tagging data, consumption metric data, utility sensor data, IoT data, retail/consumer data, gaming data, healthcare data, or other data) through network interface circuitry (e.g., communication interfaces 512, see below) from one or more data sources 111, which may be different from one another (204). In various implementations, the data ingestion serverless tasks 112 may include source data 114 with in a defined analysis window. For example, data outside the analysis window may be excluded from the source data 114. In an example scenario, a defined analysis window may include a 90-day period. In the example scenario, the data ingestion serverless tasks 112 may exclude, from the detail data, data originating outside the 90-day period. In various implementations, the source data may be stored within a source stored item.

The data ingestion serverless tasks may create a databaseless data foundation 101. In some cases, the creation process may be iterative. For example, the data ingestion serverless tasks may iterate across one or more entity identifiers within the data. For example, the entity identifiers may identify clients, data sources, logical groupings or other entities that provide a basis for data separation.

In iterative implementations of data foundation 101 creation, for each of the entity identifiers, the data ingestion serverless tasks may filter the source data 114 to generate entity data 116 (204). The filtered entity data 116 may include data relevant to the entity associated with the entity identifier. The filtering process may include keyword filtering, content filtering, date-range filtering or other filtering to identify data relevant to the entity associated with the entity identifier.

After filtering the source data 114 in accord with the entity identifier to generate the entity data 116, the data ingestion serverless tasks may filter the entity data 116 using topic-associated queries to generate topic-associated data 118 (206). The topic-associated queries may include content filtering (such as string searches, filename searches, text queries, or other filter techniques) to separate the entity data 116 by topic. For example, the entity data may be filtered based on data relevant to "cost-metrics" and may employ topic-associated queries (for example, keyword search terms) likely to identify cost metric related data. In various implementations, the topic-associated queries may relate to various topics relevant to the processing performed at the processing tier. In an analytics processing example scenario, the topic-associated queries may identify historical utilization data, cost metric data, and/or tagging data such as those discussed in U.S. patent application Ser. No. 15/922,659, filed Mar. 15, 2018, entitled Prescriptive Analytics Based Committed Compute Reservation Stack for Cloud Computing Resource Scheduling, which is incorporated by reference in its entirety or U.S. patent application Ser. No. 15/925,075, filed Mar. 19, 2018, entitled Resource Control Stack Based System for Multiple Domain Presentation of Cloud Computing Resource Control, which is incorporated by reference in its entirety.

After generating the topic-associated data 118, the data ingestion serverless tasks 112 may group the topic-associated data into one or more file-object stored items 102 (208). The file-object stored items 102 serve as building blocks of the data foundation 101. The file-object stored items 102 are implemented to be used with metadata to provide databaseless operations that supplant database dependent implementation of data processing (e.g., "Big-Data" processing).

For the second building block of the data foundation 101, the data ingestion serverless tasks 112 may capture input metadata 103 based on the topic-associated queries (210) and store the captured input metadata 103 to establish the data foundation (212). The input metadata provides a guide reference for the contents of the file-object stored items. For example, in place of extensive indexing to support certain database operations, the data foundation may rely on the captured input metadata as a reference for pinpointing content within the file-object stored items. In various implementations, the captured metadata may be stored within the file-object stored items themselves. In an illustrative example, the captured input metadata may be stored within the file-object stored item to which the metadata is relevant. In another example, the captured input metadata may be stored within another (e.g., centralized metadata storage) file-object stored item with reference to the relevant target file-object stored item.

In various implementations, the data foundation may be created without necessarily iterating over entity identifiers, but rather generating the file-object stored items using the topic-associated queries on the source data 114.

After the data foundation is established (either iteratively or otherwise), the data ingestion serverless tasks may generate an ingestion inter-tier communication link (214). Inter-tier communication links may allow serverless tasks in first tier pass data to serverless tasks structured into another tier. For example, inter-tier communication links may utilize network hardware resources to communicate with serverless tasks running across distributed system. Additionally or alternatively, inter-tier communication links may use data transfers over internal system buses. In some cases, the inter-tier communication links may include memory addresses (registers, pointers, or other memory addresses) where communication from one serverless task to another serverless task may be stored and accessed to effect communication between the tasks. In some cases, publish and subscribe (pub/sub) messaging may be used to communicate between the layers. In an illustrative example, an inter-tier communication link may use a simple-notification-service (SNS) pub/sub system.

Using the ingestion inter-tier communication link 119, the data ingestion serverless tasks 112 may initiate one or more processing serverless tasks 122 at the data integration and processing tier 120 (216). Initiation of serverless tasks may include sending a message indicating that the task should be executed. In some cases, the initiation may further include sending a task descriptor (e.g., a token or other data structure) that details the operation, dependencies, or other data used to setup the new serverless task. Accordingly, a first serverless task may spawn a second serverless task without necessarily depending input from a third source. In other words, initiation may include actions ranging from sending a notification to start a new serverless to fully detailing and establishing the new serverless task, and/or other actions. In some cases, initiation may occur indirectly. For example, a first serverless task may initiate a second serverless task with instructions to initiate a third serverless task as a mode of initiating the third serverless task.

Responsive to initiation by the data ingestion serverless tasks 112, the MTDFL 200 may establish the one or more processing serverless tasks 122 (218). Over the ingestion inter-tier communication link 119, the MTDFL 200 may receive the initiation messages and/or task descriptors from the data ingestion serverless tasks 112. The MTDFL 200 may setup the one or more processing serverless tasks 122 based on the received data. In some cases, the MTDFL 200 may operate through the data ingestion serverless tasks 112 to effect setup of the one or more data integration serverless tasks 122.

Once the one or more processing serverless tasks 122 are initiated, the processing serverless task may access the data foundation (220). The processing serverless tasks may then iterate across the one or more file-object stored items within the data foundation. In some implementations, the "iterations" may be performed in parallel, e.g., by multiple processing serverless tasks. For example, in some processing implementations, the processing operations performed by the processing serverless tasks may be not necessarily be dependent on a particular order of operations. Accordingly, with regard to this disclosure, the iterations performed by serverless tasks (data ingestion, processing, directed storage, or other types of serverless tasks) in various implementations may refer to iterations done serially (e.g., serial iterations), in parallel (e.g., parallel iterations), or a combination thereof (e.g., partially serial and/or partially parallel).

In some implementations, to iterate across the one or more file-object stored items, the processing serverless tasks 122 may iterate over storage identifiers for the one or more file-object stored items (222). For example, the processing serverless tasks 122 may reference object storage identifiers to access the one or more file-object stored items.

While iterating over across the one or more file-object stored items, the processing serverless tasks 122 may determine an order to execute multiple operations on current file-object stored item (224). For example, the processing serverless tasks 122 may identify a processing job to perform on the file-object stored item. Decomposed, the processing job may include multiple operations (e.g., processor-level operations or other computational operations) for completion. The processing serverless tasks 122 may determine a sequence for those multiple operations making up the processing job. The processing serverless tasks may then execute the multiple operations in the order determined (228).

As a result of the multiple operations on the file-object stored items, the processing serverless task may generate one or more output-object stored items 104 (230). In various implementations, the processing serverless tasks may implement different levels of correspondence between file-object stored items and output-object stored items. For example, in some cases, the processing serverless tasks 122 may translate file-object stored items into output-object stored items in a one-to-one operation. In some cases, the processing serverless tasks may concatenate results from multiple file-object stored items into a single output-object stored item. In some cases, the processing serverless tasks 122, may divide results from a single file-object stored item into multiple output-object stored items. Accordingly, in various implementations, the number of output-object stored items may correspond to the number of file-object stored items, correspond to a multiple of the number of the file-object stored items, a divisor of the number of file-object stored items, correspond to the number of file-object stored items in another mathematical relationship, or not correspond to the number of file-object stored items.

In some implementations, before initiating the processing serverless tasks 122, the data ingestion serverless tasks may initiate one or more partitioning serverless tasks 142 at a partitioning tier (232). The partitioning serverless tasks may proceed to divide the processing job to be done into one or more processing tasks by splitting into data chunks 144 (234). The partitioning may include designating chunks 144 of data from the one or more file-object stored items. The chunks of data may corresponding to portions of the file-object stored items or multiple ones of file-object stored items. The size and number of chunks 144 may vary (in some cases, drastically vary) depending on the computational intensity of the processing job, the size of the total data to be processed, the execution limits of the serverless system, the overall processing time, and/or other processing and data size factors.

The size of the chunks may be determined based on the execution limits of the serverless tasks, the duration of overlap between successive tasks, the overall size of the file-object stored items, the number of processing serverless tasks (e.g., if pre-defined—the number of serverless tasks may be dynamically specified based on the result of partitioning), the processing job target execution duration (e.g., the entire processing duration used to complete the processing job), the complexity of processing operations, or other factors. In some implementations, partitioning schemes such as those discussed with respect to the partitioning tier discussed in U.S. patent application Ser. No. 16/159,39, filed 12 Oct. 2018, and entitled Distributed Multiple Tier Multi-Node Serverless Framework for Complex Analytics Task Execution, which was previously incorporated herein. Therein, partitioning of analytics tasks is discussed.

Once the processing job is partitioned, the partitioning serverless tasks 142 may establish a partitioning inter-tier communication link 149 (236) and establish the processing serverless tasks 122 (218) via the link. The partitioning serverless tasks 142 may use the techniques and architectures discussed above with respect to the data ingestion inter-tier communication link to establish the partitioning inter-tier communication link.

Moving now to the operation of the processing serverless tasks after generation of the output-object stored items, the processing serverless tasks 122 may initiate a processing inter-tier communication link 129 (240) using the techniques and architectures discussed above with respect to the data ingestion inter-tier communication link. Using the processing inter-tier communication link 129, the processing serverless tasks may initiate one or more directed storage serverless tasks 132 at the directed storage tier 130 (241).

The directed storage serverless tasks 132 may iterate across the one or more output-object stored items (242). For each of the output-object stored items the directed storage serverless tasks 132 may access details of the operations performed by the processing serverless tasks 122 and the metadata corresponding to the file-object stored items to capture output metadata 105 (244) for the current output-object stored item.

In some implementations, the directed storage serverless tasks may write the output metadata to an output data foundation 106 (246). The optional use of an output data foundation may be beneficial where the output data may be used in a database-like function. For example, the output of the system may be used as a basis for presentation of analytical data in various visualization and management tools fast, broad spectrum access to the data may improve the performance (e.g., speed of command execution, efficiency of operation, responsiveness to updates, or other performance metrics) of the visualizations and controls. Accordingly, inclusion of an output data foundation may improve the operation of the underlying hardware and provide technical improvements over existing market solutions.

In various implementations, the output metadata may be stored within the output-object stored items. For example, the output metadata may be stored within the output-object stored item to which it corresponds. Additionally or alternatively, output metadata for multiple output-object stored items may be stored within a single output-object stored item (e.g., centralized, at least in part).

In some implementations, the directed storage tier may utilize database systems or other non-data-foundation-based storage paradigms. In an illustrative example, the output may be used in systems lacking processing capabilities that may be assigned to storage operations. Accordingly, in the example, the system operating on the output data may not necessarily support data foundation operation. In various implementations, the directed storage serverless tasks 132 may, for each output-object stored item iterated across, decompose the output-object stored item (248) and send the decomposed data to a host server for storage 199 (250). In various implementations, the host server may support different storage paradigms (e.g., databases, such as, MySQL databases or other databases; data lakes; or other storage systems).

In various implementations, the data ingestion, data partitioning, processing, and/or directed storage serverless tasks may include a series of serverless tasks. In some cases, each task within any or each of the series may be at least partially concurrent with another task within the series. Further, within any or each of the series, a previous serverless task may initiate another serverless task within the same tier. In some cases, implementing the data ingestion, data partitioning, processing, and/or directed storage serverless tasks as a partially concurrent series may allow computational continuity to persist within a tier beyond execution limits. An overlap parameter may be used to determine the duration of overlap between partially or fully concurrent serverless tasks. The overlap parameter may be selected based on multiple factors including the amount of data communication used to maintain continuity between serverless tasks, the desired level of parallelism in operation, the volume of processing jobs, or other factors.

In various implementations, control of the various serverless tasks and stored items described above may be implemented via a serverless-management host interface for control of serverless tasks and a storage-management host interface for management of stored items. In illustrative example scenarios, serverless-management host interface may be provided via the Amazon(R) Web Services (AWS) Lambda(TM) Service and the storage-management host interface may be provided by the AWS Simple Cloud Storage Service (S3), Microsoft(R) Azure Block Blob, and/or Google(R) Cloud Storage.

Figure 3:
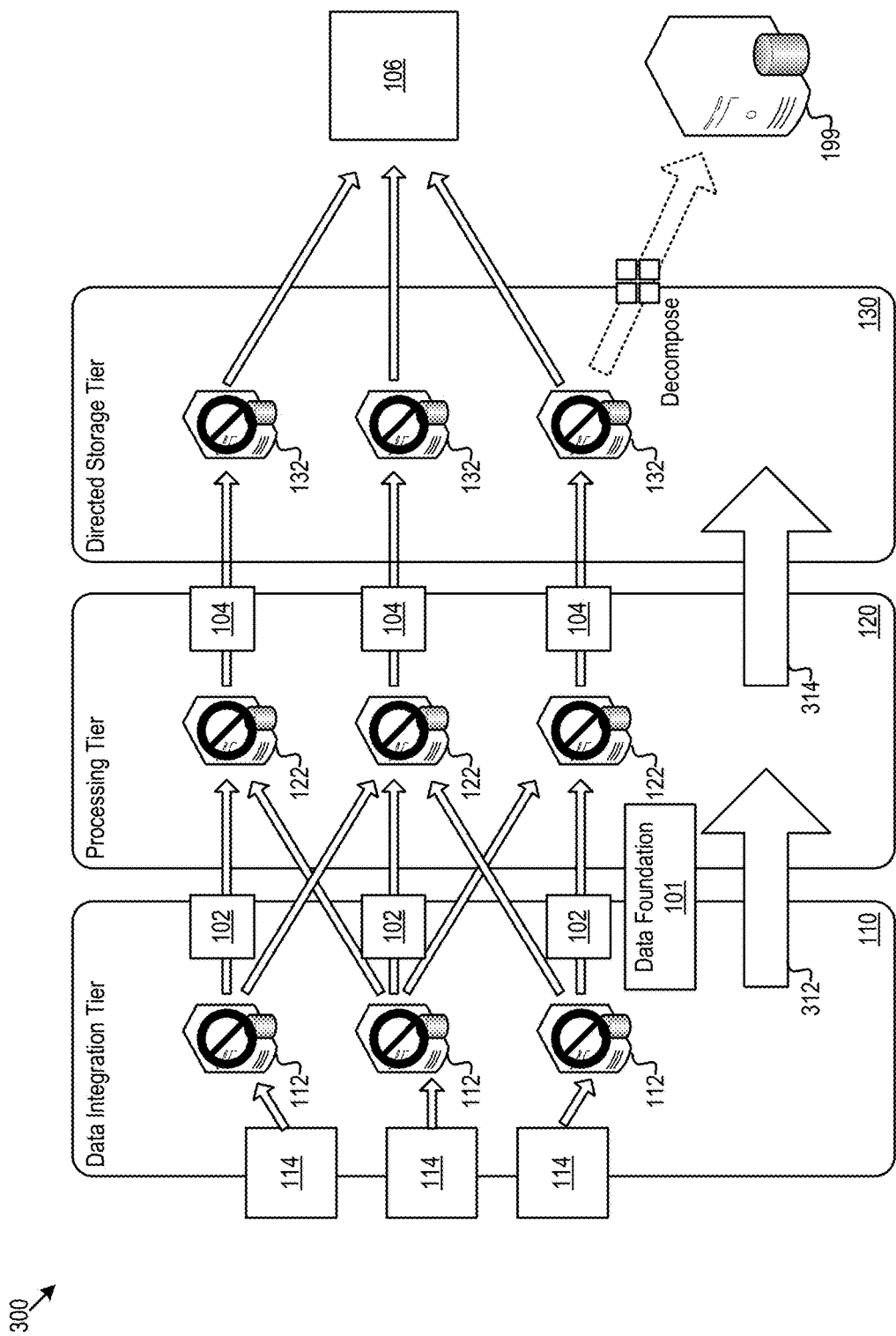
FIG. 3 shows an example multiple-tier execution flow for the multiple tier data foundation logic of FIG. 2.

FIG. 3 shows an example multiple-tier execution flow 300 for the MTDFL 200. At the data ingestion tier 110, the data ingestion serverless tasks 112 may process source data 114 from various sources to generate file-object stored items 102. The data ingestion serverless tasks may send an inter-tier communication 312 (e.g., via an inter-tier communication link) to initiate the processing serverless tasks 122 at the processing tier 120. The processing serverless tasks 122 may iterate across the file-object stored items 102 to generate the output-object stored items 104. The processing serverless tasks 122 may send an inter-tier communication 314 (e.g., via an inter-tier communication link) to initiate the directed storage serverless tasks 132 at the directed storage tier 130. The directed storage serverless tasks 132 may iterate across the output-object stored items 104 to attach the output-object stored items to output metadata to create an output data foundation 106. Alternatively or additionally, the directed storage serverless tasks may decompose the output-object stored items for data warehousing in a database, data lake, or other storage paradigm.

Figure 4:
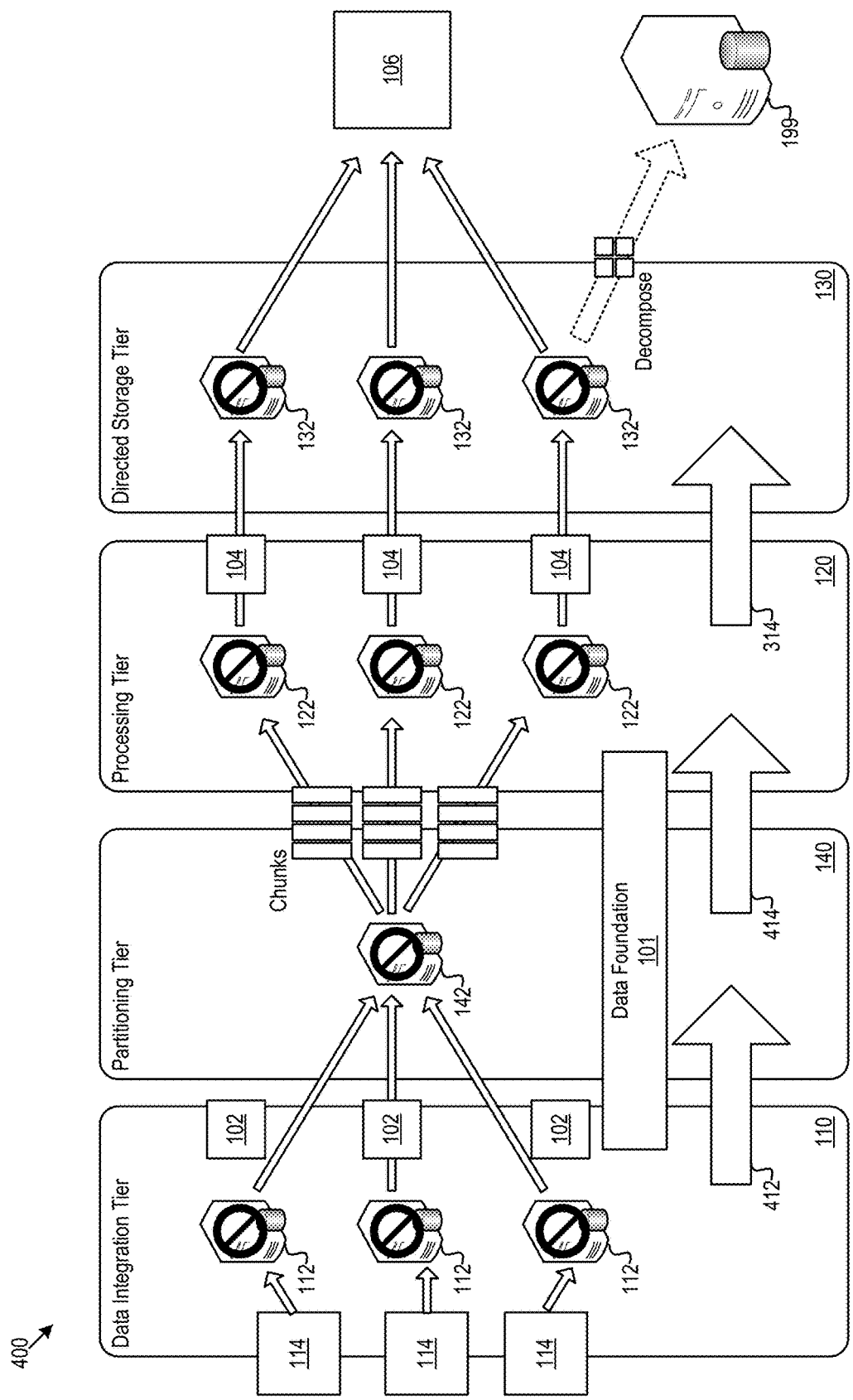
FIG. 4 shows a second example multiple-tier execution flow for the multiple tier data foundation logic of FIG. 2.

FIG. 4 shows a second example multiple-tier execution flow 400 for the MTDFL 200. In the second example multiple-tier execution flow 400, a partitioning tier 140 resides between the data ingestion tier 110 and the processing tier 120. The data ingestion serverless tasks 112 may send an inter-tier communication 412 (e.g., via an inter-tier communication link) to initiate the partitioning serverless tasks 142 at the partitioning tier 140. The partitioning serverless tasks 142 may designate chunks for processing at the processing tier 120. The partitioning serverless tasks 142 may send an inter-tier communication 414 (e.g., via an inter-tier communication link) to initiate the processing serverless tasks 122 at the processing tier 120.

Figure 5:
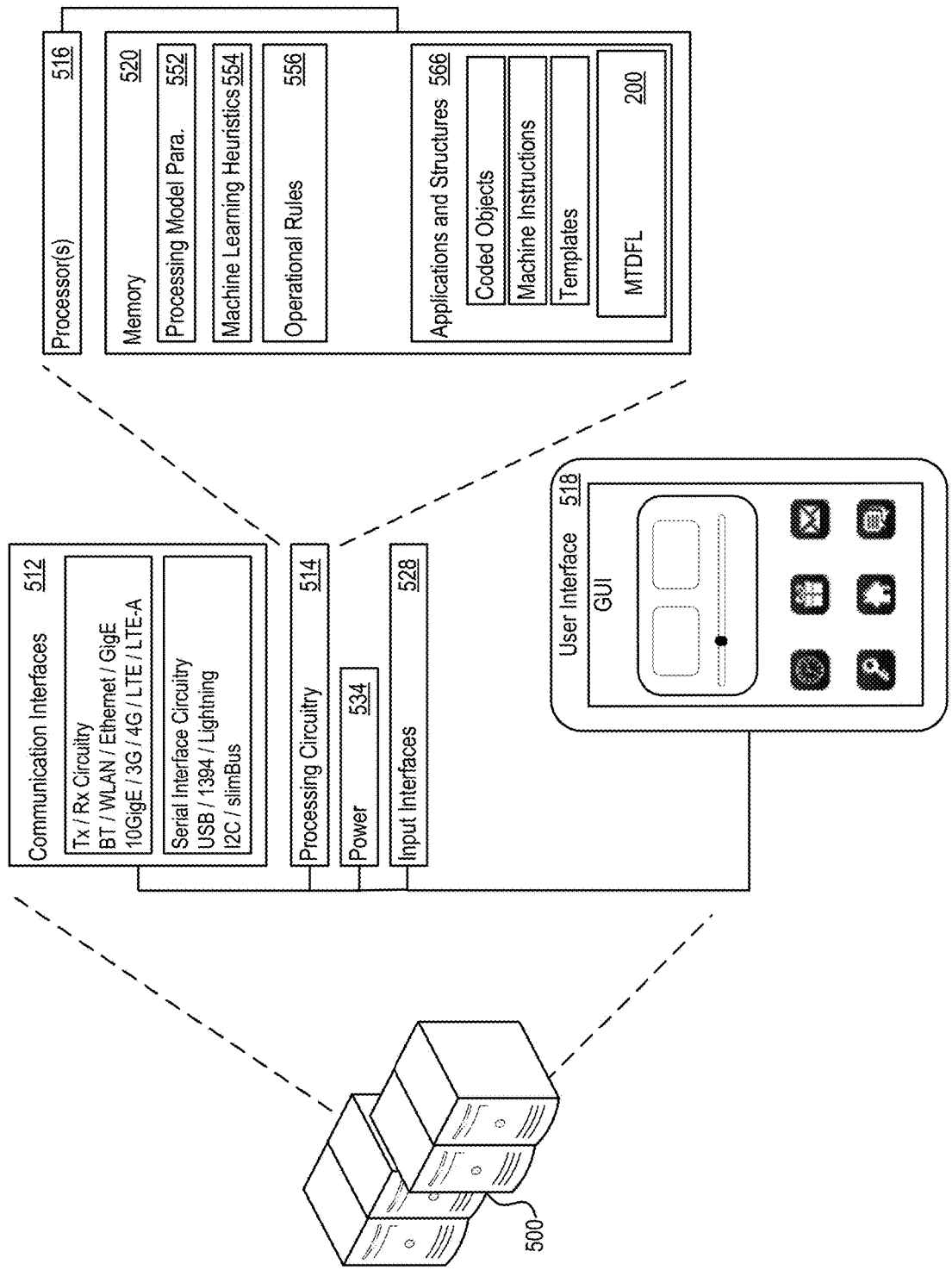
FIG. 5 shows an example execution environment 500 for the multiple tier serverless system of FIG. 1.

FIG. 5 shows an example execution environment 500 for the MTSS 100 described above. The execution environment 500 may include processing circuitry 514 to support execution of the multiple tiers of MTSS 100 described above. The processing circuitry 514 may include processors 516, memory 520, and/or other circuitry. In various implementations, the execution environment may include a serverless execution environment. Accordingly, the process circuitry may include the underlying circuitry used to execute the serverless tasks. In some cases, the circuitry used to perform one or more of the serverless tasks may be the distributed. The instructions stored on the processing circuitry (whether localized or distributed) transforms the processing circuitry into a specifically configured machine in accord with some or all of the architectures and techniques discussed in this disclosure. In some distributed cases, the specific portion of the distributed hardware that may be executing the serverless tasks may change as execution progresses.

The memory 520 may include processing model parameters 552, machine learning heuristics 554, and operational rules 556. The memory 520 may further include applications and structures 566, for example, coded objects, machine instructions, templates, or other structures to support filtering, data grouping into file-object stored items, processing operations, generation of output-object stored items or other tasks described above. The applications and structures may implement the MTDFL 200.

The execution environment 500 may also include communication interfaces 512, which may support wireless, e.g. Bluetooth, Wi-Fi, WLAN, cellular (4G, LTE/A, 5G), and/or wired, Ethernet, Gigabit Ethernet, optical networking protocols. The communication interfaces 512 may also include serial interfaces, such as universal serial bus (USB), serial ATA, IEEE 1394, lighting port, I²C, slimBus, or other serial interfaces. The communication interfaces 512 may be used to support and/or implement remote operation of the MTSS 100. The execution environment 500 may include power functions 534 and various input interfaces 528. The execution environment may also include a user interface 518 that may include human-to-machine interface devices and/or graphical user interfaces (GUI). The user interface 518 may be used to support and/or implement local operation of the MTSS 100. As discussed above, in various implementations, the processing circuitry 514 may be distributed over one or more physical servers, be implemented as one or more virtual machines, be implemented in container environments such as Cloud Foundry or Docker, and/or be implemented in serverless (functions as-a-service) environments.

In some cases, the execution environment 500 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the MTSS 100, of the execution environment onto the hardware resources. In some cases, a manifest may be stored as a preference file such as a YAML (yet another mark-up language), JSON, or other preference file type.

The methods, devices, processing, circuitry, and logic described above and below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

EXAMPLE IMPLEMENTATIONS

The example implementations (discussed below are included for the purposes of example illustration of the techniques and architectures discussed. The principles illustrated in the example implementations may be applied separately, combined, or in different contexts from those of the example implementation. For example, various ones of the implementations discussed below are discussed in the context of AWS Lambda(TM) and AWS S3. However, the principles may be applied to other serverless platforms.

Example Implementation 1

In some cases, the principles discussed above may be used to obtain consumption savings (e.g., savings via cost metrics) compared to database and data warehousing based systems. Table 1 shows unit consumption for an example data warehousing system versus and example database-less data-foundation-based system for data integration tier operations and their data warehousing counterparts.

TABLE 1

Data integration tier operations and data warehousing counterparts

Framework Stage/Tier

Data Warehousing Framework

| | Data Sources | | Extract | |
|---|---|---|---|---|
| Compute Servers | Database | Storage | Transform Load (ETL) | OLAP Servers |
| 32-Core Dell Power Edge M820 Server - 8 Servers Cost: 21600 Units | Oracle 11 g Enterprise Edition Cost: 380000 Units | Seagate ST9300653SS Disk Drive 500 GB Included with Server | SAP Business Warehouse 7.3 Cost: 25000 Units | SAP NetWeaver OLAP Server Cost: 2500 Units |

Data Foundation Framework
Data Ingestion

| Compute Servers | Database | Storage |
|---|---|---|
| 60 AWS Lambda Serverless Compute Functions (total execution time 5 hours) Cost: $214 Units | N/A | 2090 Cloud Storage Objects/day Estimated Size 930 GB/year Cost: 256.68 Units |

Table 2 shows unit consumption for an example data warehousing system versus and example database-less data-foundation-based system for processing tier operations and directed storage tier operations and their data warehousing counterparts.

TABLE 2

Processing and directed storage tier operations and data warehousing counterparts Framework Stage/Tier

Data Warehousing Framework

| | Database Block Storage | | |
|---|---|---|---|
| Analytic Processing | Compute Servers | Database | Storage |
| Microsoft R server powered by Intel Skylake Processor (1 year) Cost 57000 Units | SAP Business Warehouse 7.3 Included at ETL Stage | Oracle 11 g Enterprise Edition Included at Database Stage | Seagate ST9300653SS Disk Drive 500 GB Included with Server |

Data Foundation Framework

| Processing | | Directed Storage | | |
|---|---|---|---|---|
| Compute Servers | Storage | Compute Servers | Database | Storage |
| 600 AWS Lambda Serverless Compute Functions (total execution time 10 hours) Cost: $358 Units | 1900 Cloud Storage Objects/day Estimated Size 360 GB/year Cost: 99.36 Units | 1900 AWS Lambda Serverless Compute Functions (total execution time 3 hours 10 minutes) Cost: $159.38 Units | N/A | 1900 Cloud Storage Objects/day Estimated Size 360 GB/year Cost: 99.36 Units |

Example Implementation 2

In an example, the system may use algorithms with implementing pseudocode to implement a data foundation to support an analytic analysis of client charges via charging (e.g., billing) data.

In the example, the system may use a first algorithm along with implementing pseudocode to implement Data Ingestion of account ID charging, utilization and cost Cloud Information corresponding to each client and then to perform merge operation:

Step 1: Fetch all the Charging Files belonging to different tenants with below prefix from the bucket:

```
prefix = "SmartCSA/RS/"
s3 = boto3.resource('s3')
bucket = s3.Bucket(name=BUCKET_NAME)
FilesNotFound = True
Bucket_List = [ ]
for obj in bucket.objects.filter(Prefix=prefix):
    Charging_FileName = '{1}'.format(bucket, obj.key)
    print(Charging_FileName)
    Bucket_List.append(Charging_FileName)
    FilesNotFound = False
if FilesNotFound:
    print("ALERT", "No file in {0}/{1}".format(bucket, prefix))
print(Bucket_List)
```

Filter files with 'Charging' string and to write the First Input file of the First Tenant to be processed:

```
Charging_FileName = [k for k in Bucket_List if 'Charging' in k]
    print(Charging_FileName)
    # Preparing the Input File Name
    Input_File = str.replace(Charging_FileName[0], 'Charging_Data','01_RS_Input')
    # To write the First input file of the First Tenant to be processed
f=open("/tmp/Batch_Iteration_RSModule.csv", "w")
lineitem = Input_File + "\r\n"
print("Charging_FileName[0]")
print(Charging_FileName[0])
f.write(lineitem)
f.close( )
```

Step 3: Iterate across each tenant charging file and then performing data cleansing operations such as fetch sub string, modifying data types:

```
for i in range(len(Charging_FileName)):
    # Reading the Charging File from the bucket for each Tenant
    s3 = boto3.client('s3')
    Response = s3.get_object(Bucket=BUCKET_NAME,Key=Charging_FileName[i])
    Charging_File = Response["Body"].read( )
    Charging_File =
pandas.read_csv(io.BytesIO(Charging_File),names=Charging_File_Col_Names, skiprows= 1)
    Charging_File = Charging_File[Charging_File['UsageType'].str.contains("USW2-BoxUsage", na=False)]
```

Step 4: Implement left join between utilization and charging files based on ResourceID, Date and Hour column values:
Merged_File=pandas.merge(left=Utilization_File, right=Charging_File, how='left', left_on=['Id', 'Date1','hour'], right_on=['ResourceID', 'Date1_B','hour1_B'])

Step 5: Prepare the final merged file by doing a left join between the above merged file and the cost file based on SubCategory:
Final_Merged_File=pandas.merge(left=Merged_File, right=Cost_File, how='left', left_on='Sub.Category', right_on='Subcategory')

Step 6: Load all the input file entries into the batch execution file which contains the list of each tenant input file to be processed:

```
File = str.replace(Charging_FileName[i], 'Charging_Data', '01_RS_Input')
f=open("/tmp/Batch_Execution_RSModule.csv", "a+")
lineitem = File + "\r\n"
f.write(lineitem)
f.close( )
```

Step 7: Write the input file of each tenant to the s3 bucket:

```
csv_buffer = BytesIO( )
    Final_Merged_File.to_csv(csv_buffer)
    s3_resource = boto3.resource('s3')
    s3_resource.Object(BUCKET_NAME, File).put(Body=csv_buffer.getvalue( ))
```

In the example, the system may use a second algorithm along with implementing pseudocode to concatenate the intermediate .csv output files into an output file (e.g., a single output file) in AWS S3 cloud storage.

Step 1: Fetch the SNS topic key file (format 'Trigger_csv_files_merge_C001_2017_11_24.csv' where C001 is the tenant name) which acts as a trigger notification for the .csv merger:

```
Message_Payload = json.loads(event['Records'][0]['Sns']['Message'])
Input_File = urllib.unquote_plus(Message_Payload['Records'][0]['s3']['object']['key'])
Input_File = Input_File.encode('utf-8')
# Fetching Tenant_Id ('C001' as an example)
Path = str.replace(Input_File, 'Trigger_csv_files_merge_','')
Tenant_Id = Path.rsplit('_',-1)[0]
print(Tenant_Id)
BUCKET_NAME = 'aaas-smartcsa-lambda-artifacts'
```

Step 2: Fetch all the intermediate output files generated from analytics engine serverless task into a list:

```
s3 = boto3.resource('s3')
bucket = s3.Bucket(name=BUCKET_NAME)
FilesNotFound = True
Merge_Prefix = "RS_Output/" + Tenant_Id
Merge_List = [ ]
for obj in bucket.objects.filter(Prefix=Merge_Prefix):
    Output_File = '{1}'.format(bucket, obj.key)
    print(Output_File)
    if Tenant_Id in Output_File:
        Merge_List.append(Output_File)
    FilesNotFound = False
if FilesNotFound:
    print("ALERT", "No file in {0}/{1}".format(bucket, Merge_Prefix))
```

Step 3: Iterate through the list and appending each file contents to the temp list:

```
Temp = [ ]
Merged_Output = pandas.DataFrame(columns=Col_Names)
for i in range(len(Merge_List)):
    s3 = boto3.client('s3')
    print(Merge_List[i])
    response = s3.get_object(Bucket=BUCKET_NAME,Key= Merge_List[i])
    File = response["Body"].read( )
    Temp.append(pandas.read_csv(io.BytesIO(File), names=Col_Names, skiprows=1, index_col=False))
    print(len(Temp[i]))
```

Step 4: Concatenate the temp list contents to the dataframe 'Merged_Output':

```
Merged_Output = pandas.concat(Temp, ignore_index=True)
# Writing the Dataframe contents to the AWS s3 file using BytesIO( ) stream
csv_buffer = BytesIO( )
Merged_Output.to_csv(csv_buffer)
s3 = boto3.resource('s3')
Bucket_Name = 'acp-platform-s-aaas-smartcsa'
MS_path = 'SmartCSA/RS/' + Tenant_Id + '/' + Tenant_Id + '_RS_Output.csv'
s3.Object(Bucket_Name, AWS_path).put(Body=csv_buffer.getvalue( ))
```

Step 5: Fetch the contents of the batch execution file and then to do a lookup of the currently processed tenant entry in the file, in order to fetch the next tenant file that has to be processed in the next iteration of the Lambda Architecture flow.

Step 6: Fetch the next line to be processed e.g., the input file name of the next tenant from the batch execution file:

```
File = lines[row_num]
print("Next Input file to be processed")
```

-continued

```
print(File)
#if not os.path. exists('Batch_Iteration_RSModule.csv'):
f=open("/tmp/Batch_Iteration_RSModule.csv", "w")
lineitem = File + "\r\n"
f.write(lineitem)
f.close( )
```

Step 7: Create the batch iteration file with the input file of the next tenant entry and then validate if the file is already loaded with this new entry before writing to S3:

```
s3 = boto3.resource('s3')
    File_Exists = False
    try:
        s3. Object(BUCKET_NAME, 'SmartCSA/RS/Batch_Iteration_RSModule.csv').load( )
    except botocore.exceptions.ClientError as e:
        if e.response['Error']['Code'] == "404":
            File_Exists = False
        else:
            raise
    else:
        File_Exists = True
    print(File_Exists)
    if File_Exists == True:
        print("File already loaded")
else:
```

Step 8: Check whether all the input and output files loaded successfully for the currently processed tenant before uploading the new batch iteration file with that next tenant entry:

```
Input_Prefix = "RS/" + Tenant_Id
s3 = boto3.resource('s3')
bucket = s3.Bucket(name=Bucket)
FilesNotFound = True
Bucket_List = [ ]
for obj in bucket.objects.filter(Prefix=Input_Prefix):
    Input_File= '{1}'.format(bucket, obj.key)
    print(Input_File)
    Bucket_List.append(Input_File)
    FilesNotFound = False
if FilesNotFound:
    print("ALERT", "No file in {0}/{1}".format(bucket, Input_Prefix))
Output_Prefix = "RS_Output/" + Tenant_Id
Bucket_List = [ ]
for obj in bucket.objects.filter(Prefix=Output_Prefix):
    Output_File= '{1}'.format(bucket, obj.key)
    print(Output_File)
    Bucket_List.append)Output_File)
    FilesNotFound = False
if FilesNotFound:
    print("ALERT", "No file in {0}/{1}".format(bucket, Output_Prefix))
if Input_Files_Count == Output_Files_Count:
    s3 = boto3.client('s3')
    s3.upload_file('/tmp/Batch_Iteration_RSModule.csv', BUCKET_NAME,
        'SmartCSA/RS/Batch_Iteration_RSModule.csv')
    print("Iteration File uploaded")
else:
    print("All Output files are not loaded")
except IndexError:
    print("All clients Data Processed")
```

Various implementations may use the techniques and architectures described above.

A1 In an example, a system includes: network interface circuitry configured to access a source stored item; tiered analytic processing circuitry in data communication with the network interface circuitry, the tiered analytic processing circuitry configured to execute multiple tiers of serverless tasks, the multiple tiers including: a data ingestion tier; a processing tier; and a directed storage tier; the tiered analytic processing circuitry configured to: establish, at the data ingestion tier, a data ingestion serverless task configured to: create a database-less data foundation by: for each entity identifier of one or more entity identifiers: filtering content within the source stored item based on the entity identifier to generate entity data; filtering the entity data based on a topic-associated query to generate topic-associated data; grouping the topic-associated data into one or more file-object stored items; capturing input metadata for the one or more file-object stored items based on the topic-associated query; and writing the input metadata to an input data foundation; generate an ingestion inter-tier communication link; and via the ingestion inter-tier communication link: initiate a processing serverless task; responsive to initiation from the data ingestion serverless task, establish, at the processing tier, the processing serverless task, the processing serverless task configured to: access the input data foundation; iterate across the one or more file-object stored items by: for each of the one or more file-object stored items: based on input metadata within the input data foundation for a current file-object stored item: determining an order for multiple operations for the current file-object stored item; executing the multiple operations on the current file-object stored item according to the order; and via the multiple operations, writing to a current output-object stored item stored among one or more output-object stored items; generate a processing inter-tier communication link; and via the processing inter-tier communication link: initiate a directed storage serverless task; and responsive to initiation from the processing serverless task, establish, at the directed storage tier, the directed storage serverless task, the directed storage serverless task configured to: iterate across the one or more output-object stored items by: for each of the one or more output-object stored items: capturing output metadata based on: input metadata for one or more file-object stored items used to generate the output-object stored item; and operations performed on the one or more file-object stored items used to generate the output-object stored item; and writing the output metadata to an output data foundation.

A2 The system of example A1, where the input data foundation is supported via storage within the one or more file-object stored items.

A3 The system of example A2, where the input metadata is stored within the one or more file-object stored items.

A4 The system of any of examples A1-A3, where the output data foundation is supported via storage within the one or more output-object stored items.

A5 The system of example A4, where the output metadata is stored within the one or more output-object stored items.

A6 The system of any of examples A1-A5, where the network interface circuitry is configured to send a request to a serverless tack host interface to establish the data ingestion serverless task, the processing serverless task, the directed storage serverless task, or any combination thereof.

A7 The system of any of examples A1-A6, where the data ingestion serverless task is configured to, via communication over network interface circuitry, access a storage host interface to perform storage operations on the one or more file-object stored items.

A8 The system of any of examples A1-A7, where grouping the topic-associated data into one or more file-object stored items includes grouping the topic-associated data into an entity-specific file-object stored item.

A9 The system of any of examples A1-A8, where the data ingestion serverless task, the processing serverless task, the directed storage serverless task, or any combination thereof includes a serially executed chain of continuity-maintaining serverless tasks.

A10 The system of example A9, where the continuity-maintaining serverless tasks are configured to maintain continuity by maintaining an overlap parameter detailing a timing overlap for successive serverless tasks.

A11 The system of any of examples A1-A10, where the data ingestion serverless task is configured to: before initiating the processing serverless task, initiate a partitioning serverless task configured to partition an analytic analysis routine into multiple chunks for completion by multiple continuity-maintaining processing serverless tasks.

A12 The system of any of examples A1-A11, where the processing serverless task is configured to iterate across the one or more file-object stored items further by iterating over storage identifiers for the one or more file-object stored items.

A13 The system of any of examples A1-A12, where the input metadata for the one or more file-object stored items is stored in one or more other file-object stored items.

A14 The system of any of examples A1-A13, where the processing serverless task is further configured to: for each of the one or more output-object stored items, concatenate results of the multiple operations on the current file-object stored item with results from a previous file-object stored item also stored in the current output-object stored item.

B1 In an example, a method includes: accessing, via network interface circuitry, a source stored item; at tiered analytic processing circuitry configured to execute multiple tiers of serverless tasks: establishing, at a data ingestion tier of the multiple tiers, a data ingestion serverless task; via the data ingestion serverless task creating a database-less data foundation by: for each entity identifier of one or more entity identifiers: filtering content within the source stored item based on the entity identifier to generate entity data; filtering the entity data based on a topic-associated query to generate topic-associated data; grouping the topic-associated data into one or more file-object stored items; capturing input metadata for the one or more file-object stored items based on the topic-associated query; and writing the input metadata to an input data foundation; generating an ingestion inter-tier communication link; and via the ingestion inter-tier communication link: initiating a processing serverless task; responsive to initiation from the data ingestion serverless task, establishing, at a processing tier of the multiple tiers, the processing serverless task; via the processing serverless task: accessing the input data foundation; iterating across the one or more file-object stored items by: for each of the one or more file-object stored items: based on input metadata within the input data foundation for a current file-object stored item: determining an order for multiple operations for the current file-object stored item; executing the multiple operations on the current file-object stored item according to the order; and via the multiple operations, writing to a current output-object stored item stored among one or more output-object stored items; generating a processing inter-tier communication link; and via the processing inter-tier communication link: initiating a directed storage serverless task; and responsive to initiation from the processing serverless task, establishing, at a directed storage tier of the multiple tiers, the directed storage serverless task; via the directed storage serverless task: iterating across the one or more output-object stored items by: for each of the one or more output-object stored items: capturing output metadata based on: input metadata for one or more file-object stored items used to generate the output-object stored item; and operations performed on the one or more file-object stored items used to generate the output-object stored item; and writing the output metadata to an output data foundation.

B2 The method of example B1, where the data ingestion serverless task, the processing serverless task, the directed storage serverless task, or any combination thereof includes a serially executed chain of continuity-maintaining serverless tasks.

B3 The method of example B2, where the continuity-maintaining serverless tasks maintain continuity by maintaining an overlap parameter detailing a timing overlap for successive serverless tasks.

C1 In an example, a product includes: machine-readable media other than a transitory signal; and instructions stored on the machine-readable media, the instructions configured to, when executed, to cause a machine to: access, via network interface circuitry, a source stored item; at tiered analytic processing circuitry configured to execute multiple tiers of serverless tasks: establish, at a data ingestion tier of the multiple tiers, a data ingestion serverless task; via the data ingestion serverless task: create a database-less data foundation by: for each entity identifier of one or more entity identifiers: filtering content within the source stored item based on the entity identifier to generate entity data; filtering the entity data based on a topic-associated query to generate topic-associated data; grouping the topic-associated data into one or more file-object stored items; capturing input metadata for the one or more file-object stored items based on the topic-associated query; and writing the input metadata to an input data foundation; generate an ingestion inter-tier communication link; and via the ingestion inter-tier communication link: initiate a processing serverless task; responsive to initiation from the data ingestion serverless task, establish, at a processing tier of the multiple tiers, the processing serverless task; via the processing serverless task: access the input data foundation; iterate across the one or more file-object stored items by: for each of the one or more file-object stored items: based on input metadata within the input data foundation for a current file-object stored item: determining an order for multiple operations for the current file-object stored item; executing the multiple operations on the current file-object stored item according to the order; and via the multiple operations, writing to a current output-object stored item stored among one or more output-object stored items; generate a processing inter-tier communication link; and via the processing inter-tier communication link: initiate a directed storage serverless task; and responsive to initiation from the processing serverless task, establish, at a directed storage tier of the multiple tiers, the directed storage serverless task; via the directed storage serverless task: iterate across the one or more output-object stored items by: for each of the one or more output-object stored items: capturing output metadata based on: input metadata for one or more file-object stored items used to generate the output-object stored item; and operations performed on the one or more file-object stored items used to generate the output-object stored item; and writing the output metadata to an output data foundation.

C2 The product of example C1, where the data ingestion serverless task is configured to: before initiating the processing serverless task, initiate a partitioning serverless task configured to partition an analytic analysis routine into multiple chunks for completion by multiple continuity-maintaining processing serverless tasks.

C3 The product of example C2, where the partitioning serverless task is configured to determine a number for the multiple chunks based on: a processing volume for the analytic analysis routine; and a duration for each of the multiple continuity-maintaining processing serverless tasks.

D1 A method implemented by operation of a system of any of examples A1-A14.

E1 A product comprising instructions stored on a machine readable medium, the instructions configured to cause a machine to implement the method of example D1.

Various implementations have been specifically described. However, many other implementations are also possible.

What is claimed is:

1. A system including:
network interface circuitry configured to access a source stored item;
tiered analytic processing circuitry in data communication with the network interface circuitry, the tiered analytic processing circuitry configured to execute multiple tiers of serverless tasks, the multiple tiers including:
a data ingestion tier;
a processing tier; and
a directed storage tier;
the tiered analytic processing circuitry configured to:
establish, at the data ingestion tier, a data ingestion serverless task configured to:
create a database-less data foundation by:
for each entity identifier of one or more entity identifiers:
filtering content within the source stored item based on the entity identifier to generate entity data;
filtering the entity data based on a topic-associated query to generate topic-associated data;
grouping the topic-associated data into one or more file-object stored items;
capturing input metadata for the one or more file-object stored items based on the topic-associated query; and
writing the input metadata to an input data foundation;
generate an ingestion inter-tier communication link; and
via the ingestion inter-tier communication link:
initiate a processing serverless task;
responsive to initiation from the data ingestion serverless task, establish, at the processing tier, the processing serverless task, the processing serverless task configured to:
access the input data foundation;
iterate across the one or more file-object stored items by:
for each of the one or more file-object stored items:
based on the input metadata within the input data foundation for a current file-object stored item:
determining an order for multiple computational operations for the current file-object stored item;

executing the multiple computational operations on the current file-object stored item according to the order; and
via the multiple computational operations, writing to one or more current output-object stored items stored among one or more output-object stored items, wherein the multiple computational operations on the current file-object stored item translate the current file-object stored item into the one or more current output-object stored items by distributing results of the multiple computational operations on the current file-object stored item into multiple corresponding output-object stored items;
generate a processing inter-tier communication link; and
via the processing inter-tier communication link:
initiate a directed storage serverless task; and
responsive to initiation from the processing serverless task, establish, at the directed storage tier, the directed storage serverless task, the directed storage serverless task configured to:
iterate across the one or more output-object stored items by:
for each of the one or more output-object stored items:
capturing output metadata based on:
the input metadata for the one or more file-object stored items, the one or more file-object stored items being applied to generate the output-object stored item; and
the computational operations performed on the one or more file-object stored items applied to generate the output-object stored item; and
writing the output metadata to an output data foundation.

2. The system of claim 1, where the input data foundation is supported via storage within the one or more file-object stored items.

3. The system of claim 2, where the input metadata is stored within the one or more file-object stored items.

4. The system of claim 1, where the output data foundation is supported via storage within the one or more output-object stored items.

5. The system of claim 4, where the output metadata is stored within the one or more output-object stored items.

6. The system of claim 1, where the network interface circuitry is configured to send a request to a serverless task host interface to establish the data ingestion serverless task, the processing serverless task, the directed storage serverless task, or any combination thereof.

7. The system of claim 1, where the data ingestion serverless task is configured to, via communication over the network interface circuitry, access a storage host interface to perform storage operations on the one or more file-object stored items.

8. The system of claim 1, where grouping the topic-associated data into the one or more file-object stored items includes grouping the topic-associated data into an entity-specific file-object stored item.

9. The system of claim 1, where the data ingestion serverless task, the processing serverless task, the directed storage serverless task, or any combination thereof includes a serially executed chain of continuity-maintaining serverless tasks.

10. The system of claim 9, where the continuity-maintaining serverless tasks are configured to maintain continuity by maintaining an overlap parameter detailing a timing overlap for successive serverless tasks.

11. The system of claim 1, where the data ingestion serverless task is configured to: before initiating the processing serverless task, initiate a partitioning serverless task configured to partition an analytic analysis routine into multiple chunks for completion by multiple continuity-maintaining processing serverless tasks, wherein sizes of the chunks are determined based on at least one of the following factors: execution limits of the processing serverless tasks, a duration of overlap between the processing serverless tasks, an overall size of the one or more file-object stored items, a number of all the processing serverless tasks, and complexity of the computational operations.

12. The system of claim 1, where the processing serverless task is configured to iterate across the one or more file-object stored items further by iterating over storage identifiers for the one or more file-object stored items.

13. The system of claim 1, where the input metadata for the one or more file-object stored items is stored in one or more other file-object stored items.

14. The system of claim 1, where the processing serverless task is further configured to:
for each of the one or more output-object stored items, concatenate results of the multiple computational operations on the current file-object stored item with results from a previous file-object stored item also stored in the current output-object stored item.

15. A method including:
accessing, via network interface circuitry, a source stored item;
at tiered analytic processing circuitry configured to execute multiple tiers of serverless tasks:
establishing, at a data ingestion tier of the multiple tiers, a data ingestion serverless task;
via the data ingestion serverless task:
creating a database-less data foundation by:
for each entity identifier of one or more entity identifiers:
filtering content within the source stored item based on the entity identifier to generate entity data;
filtering the entity data based on a topic-associated query to generate topic-associated data;
grouping the topic-associated data into one or more file-object stored items;
capturing input metadata for the one or more file-object stored items based on the topic-associated query; and
writing the input metadata to an input data foundation;
generating an ingestion inter-tier communication link; and
via the ingestion inter-tier communication link:
initiating a processing serverless task;
responsive to initiation from the data ingestion serverless task, establishing, at a processing tier of the multiple tiers, the processing serverless task;
via the processing serverless task:
accessing the input data foundation;
iterating across the one or more file-object stored items by:
for each of the one or more file-object stored items:
based on the input metadata within the input data foundation for a current file-object stored item:

determining an order for multiple computational operations for the current file-object stored item;
executing the multiple computational operations on the current file-object stored item according to the order; and
via the multiple computational operations, writing to one or more current output-object stored items stored among one or more output-object stored items, wherein the multiple computational operations on the current file-object stored item translate the current file-object stored item into the one or more current output-object stored items by distributing results of the multiple computational operations on the current file-object stored item into multiple corresponding output-object stored items;
generating a processing inter-tier communication link; and
via the processing inter-tier communication link:
initiating a directed storage serverless task; and
responsive to initiation from the processing serverless task, establishing, at a directed storage tier of the multiple tiers, the directed storage serverless task;
via the directed storage serverless task:
iterating across the one or more output-object stored items by:
for each of the one or more output-object stored items:
capturing output metadata based on:
the input metadata for the one or more file-object stored items, the one or more file-object stored items being applied to generate the output-object stored item; and
the computational operations performed on the one or more file-object stored items applied to generate the output-object stored item; and
writing the output metadata to an output data foundation.

16. The method of claim 15, where the data ingestion serverless task, the processing serverless task, the directed storage serverless task, or any combination thereof includes a serially executed chain of continuity-maintaining serverless tasks.

17. The method of claim 16, where the continuity-maintaining serverless tasks maintain continuity by maintaining an overlap parameter detailing a timing overlap for successive serverless tasks.

18. A product including:
machine-readable media other than a transitory signal; and
instructions stored on the machine-readable media, the instructions configured to, when executed by at least one machine, to cause the at least one machine to:
access, via network interface circuitry, a source stored item;
at tiered analytic processing circuitry configured to execute multiple tiers of serverless tasks:
establish, at a data ingestion tier of the multiple tiers, a data ingestion serverless task;
via the data ingestion serverless task:
create a database-less data foundation by:
for each entity identifier of one or more entity identifiers:
filtering content within the source stored item based on the entity identifier to generate entity data;
filtering the entity data based on a topic-associated query to generate topic-associated data;
grouping the topic-associated data into one or more file-object stored items;
capturing input metadata for the one or more file-object stored items based on the topic-associated query; and
writing the input metadata to an input data foundation;
generate an ingestion inter-tier communication link; and
via the ingestion inter-tier communication link:
initiate a processing serverless task;
responsive to initiation from the data ingestion serverless task, establish, at a processing tier of the multiple tiers, the processing serverless task;
via the processing serverless task:
access the input data foundation;
iterate across the one or more file-object stored items by:
for each of the one or more file-object stored items:
based on the input metadata within the input data foundation for a current file-object stored item:
determining an order for multiple computational operations for the current file-object stored item;
executing the multiple computational operations on the current file-object stored item according to the order; and
via the multiple computational operations, writing to one or more current output-object stored items stored among one or more output-object stored items, wherein the multiple computational operations on the current file-object stored item translate the current file-object stored item into the one or more current output-object stored items by distributing results of the multiple computational operations on the current file-object stored item into multiple corresponding output-object stored items;
generate a processing inter-tier communication link; and
via the processing inter-tier communication link:
initiate a directed storage serverless task; and
responsive to initiation from the processing serverless task, establish, at a directed storage tier of the multiple tiers, the directed storage serverless task;
via the directed storage serverless task:
iterate across the one or more output-object stored items by:
for each of the one or more output-object stored items:
capturing output metadata based on:
the input metadata for the one or more file-object stored items, the one or more file-object stored items being applied to generate the output-object stored item; and
the computational operations performed on the one or more file-object stored items applied to generate the output-object stored item; and
writing the output metadata to an output data foundation.

19. The product of claim 18, where the data ingestion serverless task is configured to: before initiating the processing serverless task, initiate a partitioning serverless task configured to partition an analytic analysis routine into multiple chunks for completion by multiple continuity-maintaining processing serverless tasks, wherein sizes of the chunks are determined based on at least one of the following factors: execution limits of the processing serverless tasks, a duration of overlap between the processing serverless tasks, an overall size of the one or more file-object stored items, a number of all the processing serverless tasks, and complexity of the computational operations.

20. The product of claim 19, where the partitioning serverless task is configured to determine a number for the multiple chunks based on:
 a processing volume for the analytic analysis routine; and
 a duration for each of the multiple continuity-maintaining processing serverless tasks.

\* \* \* \* \*